United States Patent [19]
Efthymiou

[11] 3,843,801
[45] Oct. 22, 1974

[54] PREPARATION OF FETA CHEESE
[76] Inventor: Constantine John Efthymiou, 84-63 126th St., Kew Gardens, L.I., N.Y. 11415
[22] Filed: Jan. 18, 1973
[21] Appl. No.: 324,760

Related U.S. Application Data
[63] Continuation-in-part of Ser. No. 142,415, May 11, 1971, abandoned, which is a continuation-in-part of Ser. No. 776,219, Oct. 25, 1968, abandoned, which is a continuation-in-part of Ser. No. 380,637, July 6, 1964, abandoned.

[52] U.S. Cl. ..................... 426/36, 426/39, 426/40
[51] Int. Cl. ............................................ A23c 19/02
[58] Field of Search .............................. 99/115–117; 142/415; 426/36, 43

[56] References Cited
OTHER PUBLICATIONS
Efthymiou et al., Development of Domestic Feta cheese, J. Dairy Science. Vol. 47, 1964 (pp. 593–598) SF22158.
Whittanbury, R., The Differentiation of Streptococcus Faecalis and S. Faecium, J. Gen. Microbiol. 38, 1965 (pp. 279–287) OR1 J4.
Kosikowski F., Cheese and Fermented Milk Foods, published by the author, Cornell University, N.Y. 1966 (pp. 14, 15) SF271.K6.

Primary Examiner—David M. Naff
Attorney, Agent, or Firm—Themis C. Pailas

[57] ABSTRACT
Feta cheese is prepared by a process involving adding during the step of acidifying the milk a combination of ripening agents comprising a rated amount of proteolytic lacto-bacilli to effect a controlled advanced degree of proteolysis associated with a creamy, soluble body and *Streptococcus faecium* stains of enterococci viable and active through the range of ripening parameters.

3 Claims, No Drawings

PREPARATION OF FETA CHEESE

This is a continuation-in-part of my application Ser. No. 142,415 filed May 11, 1971 which is a continuation-in-part of application Ser. No. 776,219, filed Oct. 25, 1968 which is a continuation-in-part of application Ser. No. 380,637, filed July 6, 1964, all now abandoned.

This invention relates generally to the manufacture of cheese and to a cheese product, and more particularly to a novel method whereby an accelerated but controlled ripening, affecting substantially the entire range of physical and chemical characteristics of the cheese product, is determinately attained. The invention relates further to an improved soft, white, non-surface ripened pickled, Feta-type cheese and the method of manufacture.

Feta cheese is produced primarily in Greece. Variations of this cheese-type are also produced in Greece as well as in other Mediterranean, Near and Middle East countries. According to the stipulations of the Greek law, its moisture content qualifies it as a soft cheese. Feta cheese is usually pickled and cured in brine of varying salt concentrations. The organoleptic characteristics of the cheese depend very much on this pickling process. Typically, in Feta cheese of good quality, a pleasant, mildly piquant, slightly salty flavor may be sensed. This piquant quality, in addition to moderate salting, as a result of original work of Constantine John Efthymiou, has been attributed to substantial levels of acetic acid, developing in the cheese in a favorable ratio with total acidity. Moreover, Feta cheese may possess a distinct rancid flavor, due to extensive lipolytic activity. This characteristic, which is not universal, may be imparted through introduction into the cheese of various lipolytic agents, Harper et al. (1955), Efthymiou and Mattick (1964). Chemically, it has been associated with relatively high concentrations of free fatty acids and especially butyric, capric, lauric, myristic, palmitic and oleic acids (see ref. Efthymiou, 1967).

Physically, Feta cheese, although soft, is not pasty and on slicing retains its shape without crumbling.

Typically and traditionally, Feta cheese is made of sheep's or goat's milk without artificial coloring and it is naturally white. In some instances, cow's milk has been used instead of sheep's or goat's milk, but the resultant product has received limited consumer acceptance owing to its cow-like odor, yellowish color and other untraditional body and flavor characteristics.

There is a wide range of quality in the traditional manufacture of Feta cheese. Usually, there is no control of the microbial flora of the raw milk by cooling and/or pasteurization. Moreover, starter cultures are not used at all. In the isolated cases where starter cultures have been used (e.g., Efthymiou and Mattick, 1964), limited improvement is achieved over Sanders (1953), since the resultant product is acceptable to the average consumer only for its appearance and body characteristics but not at all for its bland and lacking flavor.

The analytical approach to the description of the spectrum of natural types of Feta cheese and the properties and characteristics thereof as well as the development of technology for their manufacture based on rational premises was first initiated by Constantine John Efthymiou in Ioannina, Greece in 1951. Ever since, Efthymiou has conducted research and continued experiments and observations on Feta cheese in both Greece and U.S.A. Certain reports and findings have been released periodically for publication. The Efthymiou and Mattick (1964) publication (submitted in 1962) was based on preliminary experiments concluded prior to 1958. The publication cited described the manufacture of Feta cheese from pasteurized cow's milk by a developed method, which comprised steps, well established in the prior art of cheese making. The cheese product which resulted from that developmental study was indeed an improvement over Sanders (1953), since it appeared standardized and free of serious body and texture defects. subsequent experiments and observations by Efthymiou have shown, however, that the method cited due to basic limitations of the ripening agents employed, failed to produce a Feta cheese with consistent chemical composition and acceptable overall flavor quality. Moreover, it fell short of the key objective, the control of development of acetic acid and consequently of the typical flavor for this type of cheese. More recent experiments and observations have shown the necessity for a new, improved method of manufacture of Feta cheese. The method disclosed hereafter introduces a new, complex system of interacting ripening agents which effects the rapid but controlled development of the total characteristics of the product and obtains a high quality Feta cheese which is marketable.

Feta cheese made from cow's milk in the traditional manner described by Sanders (1953) is substantially different qualitatively from cheese made from sheep's milk, primarily due to differences in milk composition and also indigenous microflora and enzymes. Feta cheese manufactured according to the cited traditional method from cow's milk is a product with flavor and tactual characteristics totally undesirable. Such a product manufactured on an industrial scale is an economic impossibility because of prohibitive spoilage and high rejection rates which result in high costs and negligible market acceptance.

The introduction into the manufacture of Feta cheese of conventional means of improvement such as pasteurization, ordinary lactic acid starters and flavor-inducing enzyme preparations (ref. Heid et al. (1963), Harper et al. (1955) and Efthymiou and Mattick (1964) has produced the following well recognized limited results whether the source of the milk used is the cow, ewe or goat:

(1) A standardization of the tactual properties of the cheese, which shows uniform body and texture characteristics.

(2) Clean flavor characteristics since the elimination of fermentations of the mixed lactic or butyric acid types has at the same time eliminated also the defects of gassiness and unnatural or off-flavors.

(3) A certain degree of rancidity which imparts a strong flavor preferred by some feta consumers. In particular, Efthymiou and Mattick (1964) have found that the introduction into the cheese of pregastric esterases of kid and lamb origin favors the development of an acceptable type of rancid flavor whereas similar enzymes from other sources lead to undesirable flavor types and intensities.

(4) Improvements such as the above have not yielded cheese with a typical Feta flavor even when the milk used was the traditional ewe's or goat's milk.

Even prior to the publication of the preliminary method of Efthymiou and Mattick (1964), but also since then, several analytical and organoleptic evaluations have been independently made on Feta cheese manufactured from pasteurized cow's milk according to that method. These evaluations have ascertained the following fundamental shortcomings in the method followed and the resultant product: Although Efthymiou and Mattick claimed the production of a Feta cheese with equally good flavor and body characteristics, they did not use an integrated system of interacting ripening agents to effect a rapid but controlled development of both tactual and flavor characteristics in their cheese. These workers used a combination of *Streptococcus lactis* and several species of lactobacilli to induce the development of good solubility properties and formation of acetic acid in the cheese. They reported some production of acetic acid in cheese which had been ripened for 4 to 6 months. However, an evaluation of the analytical data provided by them shows a range of variation of approximately 300 percent in the levels of acetic acid obtained in the experimental cheese. These authors could not explain the bio-chemical origin of acetic acid in their cheese and consequently they did not disclose an effective method or step to control the formation of this key flavor determinant. Efthymiou in later trials traced this extreme variation in acetic acid content to the inability of the microbial cultures used as starters to induce formation of acetic acid. Cheese made according to the preliminary method of Efthymiou and Mattick but ripened under aseptic conditions, that is conditions preventing the contamination of the ripening cheese from the environment, exhibited a bland, atypical flavor which persisted even two years after its manufacture. Chemical analyses performed on the same cheese showed no appreciable levels of acetic acid present (C. Efthymiou, unpublished data). These results could be explained on the basis of inadequate acetic acid development by the lacto-bacilli used by Efthymiou and Mattick (1964). Accordingly, it was concluded that the combination of *S. lactis* and lactobacilli was ineffectual for the induction of acetic acid in Feta cheese according to the cited method and that inadvertent contamination of the cheese with unknown microorganisms during the early stages of ripening was presumably responsible for the development of the widely variant concentrations of acetic acid reported by Efthymiou and Mattick. Further proof of the inability of the prior art lactic acid bacteria (Heid et al., 1963) to induce formation of volatile acidity in Feta cheese produced according to the cited method of Efthymiou and Mattick, came from other experiments conducted by the applicant. Strains of lactic cocci known to produce considerable amounts of volatile metabolic products and for this reason used by butter and cheese industry as flavor inducing agents, were included in starters for Feta cheese making. Again, organoleptic tests and chemical analyses showed insignificant production of volatile acids in the ripened Feta cheese, (C. Efthymiou, unpublished data). F. V. Kosikowski (1966) has taught that *Streptococcus faecalis* can be used as an acid and flavor inducing agent for the manufacture of Cheddar cheese. The question then arises whether the same microorganism can be used in a process of making Feta cheese for the development of typical flavor. The unequivocal answer to this question has been given by the experiments conducted by Kosikowski and Dahlberg. Thus, in cheddar cheese that has a long ripening period, this organism has been found to develop negligible amounts of volatile acids including acetic acid (List K of References of this application especially number 1). The beneficial effect on cheddar cheese flavor was determined by the same workers. It was traced to a slow accumulation of tyramine produced by this organism during ripening. It is obvious from the extensive documentation by Kosikowski et al that *S. faecalis* could not and cannot be expected to function in the manner required by Feta, a cheese with a ripening period as short as 1 month, with a high content of acetic acid and a flavor profile fundamentally different from that of cheddar cheese. In short, Feta cheese made according to Sanders, Heid et al., Harper et al., Efthymiou et al., and Kosikowski has been found to fall short of the desired objectives set forth herein, since repeatedly on account of poor or lacking flavor it has been shown inferior, of unacceptable composition and it has failed to pass critical marketing tests.

A primary object of the present invention is the elimination of the mentioned limitations and drawbacks of the existing methods of manufacture of Feta-type cheese.

Another object of the invention is to provide a controlled and readily duplicable manufacturing method for a marketable standardized Feta-type cheese.

Another object of the invention is to provide a method of producing a high quality Feta-type cheese using pasteurized bovine, ovine or caprine milk.

Another object is to provide high quality Feta cheese with an open texture and a soft but not pasty body which is sliceable without crumbling.

Another object of the invention is to provide a method of producing Feta type cheese using suitable microbial inocula including proteolytic lacto-bacilli and strains of *Streptococcus faecium*.

Another object of the invention is to provide a method of producing Feta type cheese using suitable interacting microbial inocula and selected lipolytic preparations.

Another object of the invention is to provide a method of using pasteurized cow's milk in the manufacture of Feta cheese by introducing suitable proteolytic and acetic acid producing microbial inocula with or without selected lipolytic preparations to effect curing with predetermined, desired consistency and flavor in a shorter period of time than would otherwise be possible.

Another object of the invention is to provide a method of producing a high quality, relatively white, Feta-type cheese using cow's milk.

It is another object of the invention to develop a cheese having typical Feta-type characteristics with a pleasant mildly piquant, independent of rancidity, slightly salty flavor.

Another object of the invention is to provide a cheese having typical Feta-type characteristics, including a smooth body without extreme solubility, but with substantial levels of soluble nitrogen and a substantial ratio of acetic to lactic acid.

Still another object of the invention is to provide a good flavored Feta-type cheese having a predetermined profile of free fatty acids, quantitatively present in an acceptable ratio to acetic acid.

Still another object of the invention is to provide a method of introducing into the cheese a system of interacting ripening agents effecting a rapid but controlled proteolysis and development of desirable body, texture and flavor characteristics, typical of marketable and high quality Feta cheese.

Still another object of the invention is to provide a method of introducing into the cheese ripening agents effective under the prevailing microecologic conditions of ripening to induce the continued development through ripening of desirable levels of acetic acid, typical of marketable and high quality Feta cheese.

Another object of the invention is to provide a cow's milk, Feta type cheese, having all the superior unique organoleptic characteristics of a quality ewe's milk, Feta cheese and containing strains of microorganisms possessing lactic acid oxidase and proteolytic activity under anaerobic conditions and active throughout ripening to ensure the sustained development of said superior characteristics through storage.

Yet another object of the invention is to provide a relatively low cost, high quality, marketable cow's milk Feta-type cheese in countries such as the United States of America where cow's milk is much more abundant than milk from other dairy animals.

According to one method of the present invention to produce a Feta variant of pickled cheese, a sufficient quantity of marketable, raw, cow's milk is processed by the low temperature, long time method (LTLT, 143°F. for 30 minutes) in a suitable, water jacketed, stainless steel vat. The milk, following pasteurization is cooled to a temperature of approximately 86°F. at which it is ripened with 1 percent microbial inoculum to an approximate increase of titratable acidity of 0.02–0.03 percent expressed in lactic acid. The preferred inoculum used consists of a 1:1 mixture of active *Streptococcus lactis* and a strain of lacto-bacilli selected for its pronounced proteolytic properties and susceptibility to the controlling action of lipolytic enzymes. Experimentation has shown that other strains of the same species of lacto-bacilli do not have either one or both of these properties.

Instead of *S. lactis* other species of lactic cocci can be used for acido-genesis. This type of microorganism, however, is not essential to the instant process. It is used here only by way of illustration since in cheesemaking it constitutes a common means to achieve acid production and proper coagulation of milk. The direct addition of acid into the raw or pasteurized milk may very well serve the same purpose and thus obviate the use of a lactic acid starter. The inoculum comprises also a strain of *Streptococcus faecium*. Depending on the method of acido-genesis by lactic starter or artificially by addition of food acids, this organism and the protoelytic preparation comprising the essential microbial and enzymic "ferment" utilized in the process, may be added at this stage or separately at a prior or later step of the manufacture.

The ripened milk is then inoculated with an aqueous dispersion of 15 grams (per 100 pounds of milk) of a powdered preparation of pregastric esterases of kid and lamb origin, (Capalase Lipase "KL", which is a commercially available lipase enzyme). Although the above preparation induces a type of rancid flavor suitable or acceptable for Feta cheese and for this reason it is preferred, pregastric esterases from other dairy animals or lipases from other sources may be selectively used. However, the introduction of pregastric esterases into Feta cheese as flavor inducing agents according to the subject invention is not essential and therefore it may be omitted altogether where the piquant, acetic-type flavor is desired exclusively. It is noted again that the latter type of flavor as distinguished from rancidity is the key Feta flavor characteristic and the only one acceptable by a large segment of Feta cheese consumers.

To set the ripened milk, sufficient liquid rennet is added to effect coagulation of the milk within 50 to 60 minutes to the proper firmness, determined by the "finger" test as is applied in cheddar cheese making. One-inch knives are used to cut the curd into cubes which are then stirred gently for 20 minutes or until the curd shows jelly-like consistency which retains the shape. Cooking the curd above the cutting temperature to help the expulsion of whey is not required. At this point the curd is ladled (in approximately 2 inch layers) from the vat into metallic forms using a flat, unperforated scoop. This step requires caution owing to the soft condition of the curd and the concomitant danger of curd breakage and loss. The forms in which the drainage of the curd is carried out are constructed of metal in the shape of a 12 inch cube with a permanent bottom and a removable, but tight-fitting lid. To facilitate drainage on all sides including the lid, the form has ⅛ inch holes bored approximately one-half inch apart. One inch legs supporting the forms either when it sits on its bottom or its lid further facilitates drainage by allowing a space between the cheese form and the table surface on which it stands. Most of the whey drainage takes place from the cheese form at first in the room where the milk is processed into cheese (at room temperature for approximately 2 hours) and then in a curing room where both temperature (less than 68°F) and relative humidity (85 percent) are maintained constant. The expulsion of the whey in the cheese form is further assisted from time to time by tipping the form gently from side to side and also by rotating it partially so that the curd breaks away from the sides and lets the expelled whey drain through the side holes. The form is also inverted to further facilitate drainage. Eighteen to 24 hours after dipping, the cheese is sufficiently firm for cutting. It is then removed from the forms and cut into large pieces or segments of such size and shape as to fit the container in which it will be ultimately packaged. The cheese segments are then dry-salted on all sides by sprinkling with coarse salt. This application is repeated every 24 hours for 3 or 4 days until the entire designated quantity of salt (approximately 3 percent on the basis of the weight of the ripened cheese) has been added. The drainage and salting are completed with the cheese segments placed flat on a slightly inclined table. The cheese is inverted daily for one week, then rinsed with tap water, rubbed gently to remove any excess salt and finally placed in suitable containers which are then filled with 3 percent NaCl solution in water or whey and sealed. The filled containers are placed in a refrigerated curing room (42°–53°F.) for storage and additional curing at low temperature. Although pasteurized milk is specified in the subject method, it is equally possible to use marketable good quality, raw milk from the ewe, goat or cow. When ewe's or goat's milk is used with the subject method, a superior, Feta cheese is produced. When cow's milk is used, the resultant Feta cheese unlike cow's milk Feta cheese made with other methods of the prior art, is relatively white, contains no trace of cowy odor, requires a minimum of bleach and is fully ripened, containing a high concentration of acetic acid.

To further consumer acceptability of Feta-type cheese made from cow's milk known bleaching agents such as benzoyl peroxide may be used to completely remove the untraditional yellowish color. Another possibility for elimiminating the yellowish color is to use cow's skim milk in the manufacture of Feta cheese, and, as desired, reintroduce substantially uncolored (naturally or by process) milk fat from suitable dairy sources.

In summary, cheese made according to the method of the invention described above possesses several novel desirable characteristics which include the following.

A system of interacting ripening agents has been introduced to effect a rapid but controlled ripening. All organoleptic properties of the cheese can be regulated by this balanced ripening system.

The combination of the disclosed ripening agents in this system allows substantially and under controlled conditions the quantitative predetermination of all ripening characteristics of Feta cheese. Since the application of the system yields results amenable to computer analysis through easily measurable ripening parameters (such as level of soluble nitrogen, total acidity and pH, non rancid volatile acidity (acetic acid), total free fatty acids and salt content), it provides the premises for the introduction and utilization of modern technology in solving conveniently the highly complex biochemical and technico-economical problem of developing a method of manufacture for a new cheese product with substantially defined analytical and organoleptic characteristics, which by no means are limited to those of Feta cheese.

The interaction of ripening agents effected by the system relates primarily and directly to the proteolytic and lipolytic agents employed and produces the desired predetermined effect in the following specified way. Very early in ripening, the introduced strains of lactobacilli which possess significant proteolytic properties act to cause a high degree of partial hydrolysis of the cheese protein and a rapid development of solubility properties in the body of cheese. At this early stage, due to a limited release of free fatty acids by the dosage of the lipolytic agent used, there is no actual interference with the hydrolytic activity of the lactobacilli. The quantitative ratio of the two primary ripening agents, proteolytic lactobacilli and lipolytic enzymes is adjusted so that sufficient inhibitory concentrations of free fatty acids arise in the cheese by the time the physicochemical breakdown of the cheese protein reaches an appropriate degree. The free fatty acids accumulate sufficiently within a few days, materially slowing down the metabolic activity of the susceptible proteolytic lactic acid bacteria. The slow, sustained proteolytic action of S. faecium ensures the removal of any bitter flavor that may develop in the course of ripening by the faster proteolytic activity of lactobacilli which are subject to inhibition by the free fatty acids released. Of course, the activity of the proteolytic lactobacilli is not contingent upon the presence of free fatty acids. Added alone in small quantities in relation to the total inoculum, they cause a moderate hydrolysis throughout ripening. Their activity, coupled with the slow proteolytic activity of S. faecium, results in a cheese product with a highly desirable soluble body. The latter practice is particularly expedient when development of any rancidity in the cheese is not at all desirable. Suitable proteolytic enzyme preparations can be used instead of the proteolytic microbes.

The use of pregastric esterases is not essential to the instant process. When they are introduced for development of a desired rancid flavor, the instant process provides for a smooth integration of their lipolytic activity within the overall ripening activities of Feta cheese. On the other hand there is no detrimental inhibition of proteolysis attending the use of pregastric esterases. On the contrary, the release of free fatty acids contributes to a regulated development of solubility properties in the cheese. In addition, the continued development of acetic acid is not impaired by the activity of these enzymes.

When pregastric esterases are not added into the milk, the ripening process will be dominated by the rapid proteolytic activity of the lactobacilli and the slow activity of S. faecium. The latter organism will also initiate in the cheese, a significant accumulation of acetic acid by metabolic conversion of lactic acid. Thus, in this case, a balanced development of body solubility and acetic flavor is attained against a low profile of free fatty acids.

The rapid differentiation of the typical flavor in Feta cheese, whether manufactured with or without the addition of lipolytic enzymes, is accomplished according to the subject method through the metabolic activities of the resistant, volatile acid producing bacteria (Streptococcus faecium) which constitutes the third ripening agent in the subject system.

There are several varieties of this organism which can be isolated from natural sources. Certain strains would not function in the manner described herein. Accordingly, S. faecium as described and used herein is defined to include strains of enterococci which, of course, conform to the taxonomic description of the species (see list of references E) and, also, possess pronounced "lactic oxidase" activity inducible under anaerobic conditions as well as proteolytic activity. "Lactic acid oxidase" activity is herein construed as the ability to initiate the utilization and conversion of lactic acid into acetic acid and carbon dioxide by oxidative and decarboxylation steps. Such activity has been demonstrated by Joseph and Efthymiou in anaerobically produced cell-free extracts of S. faecium. The same workers have determined that S. faecalis, growing anaerobically, cannot initiate the oxidative utilization (see Ref. 11, List E). This property provides a biochemical explanation for the unexpected substantive result of acetic acid development by S. faecium in Feta cheese. From the standpoint of this essential metabolic activity for the full development of the peculiar Feta cheese flavor, the difference between S. faecium and S. faecalis is qualitative and one which precludes the use of S. faecalis as an effective flavor inducing agent. S. faecalis either in resting cell suspension (see Ref. 10, List E) or cell free extracts (see Ref. 11, List E) is devoid of and shows zero amount of "lactic oxidase" activity under anaerobic conditions. Accordingly, Kosikowski fails as a reference to anticipate or suggest the novel teaching of the method set forth herein; the addition of S. faecalis into the Feta cheese ripening process does not serve the useful purpose contemplated and effected by the novel method disclosed herein.

In addition to *S. faecium*, other microorganisms possessing lactic acid oxidase and proteolytic activity under anaerobic conditions may function in a similar manner in the subject process, provided that they show similar adaptive characteristics to the microecologic environment of the ripening Feta cheese as *S. faecium*. Especially, *S. faecium* is resistant to high acidity and high concentrations of sodium chloride and it is insensitive to the presence or absence of free fatty acids. These conditions as disclosed elsewhere in this application, are decisive in determining the nature of the microenvironment in Feta cheese. The physiological and metabolic nature of this microorganism befits absolutely the type of ripening desired in Feta cheese. In addition to lactic acid it produces a substantial quantity of acetic acid by the metabolic conversion of the milk sugar and the lactic acid itself. Moreover, under the prevailing conditions of ripening and especially the low storage temperature, its near homofermentative pattern of metabolism becomes essentially heterofermentative with a very considerable relative accumulation of acetic versus lactic acid (C. Efthymiou, unpublished data). Tests have shown that other somewhat resistant bacteria such as strains of *Pediococcus cerevisiae* can be used to produce similar but limited results under the extreme microecological conditions prevailing in ripening Feta cheese.

The ripening system of the present invention relies, therefore, on a biochemical principle or factor entirely different from that relied upon by Efthymiou and Mattick to induce development of acetic acid in Feta cheese. According to Nakae and Elliott (1965) the biochemical mechanism involved in the production of volatile acids by some lactic acid bacteria is the process of oxidative deamination of amino acids. According to these researchers, in hard cheese like cheddar, ordinarily requiring a long ripening period, this process may contribute to the accumulation of volatile acids. As noted above, experiments by the applicant have shown that generally under the acid and other prevalent conditions of Feta cheese ripening the mentioned process of deamination proves unworkable. Under the latter conditions, the lactic acid bacteria used will contribute to a slow protein hydrolysis in the cheese without necessarily increasing the levels of acetic or other volatile acids. In addition, it is due to this slow and incomplete proteolysis that a bitter flavor develops in the cheese of prior art.

Applicant's novel process includes a step of adding during the step of acidifying the milk the combination of ripening agents comprising a rated amount of proteolytic enzymes to effect a controlled degree of proteolysis associated with a creamy, soluble body and strains of *Streptococcus faecium* viable and active through the range of ripening parameters to produce a substantially predetermined high level of acetic acid against a low profile of free fatty acids and a piquant, pickled cheese, the flavor of which is practically devoid of rancidity. In contrast, it is submitted that the enzymes and bacteria employed by Efthymiou and Mattick (1964) produced a flavor dominated by the free fatty acids liberated through the incorporation of pregastric esterases according to their method. Efthymiou (1967), (the applicant) established by gas liquid chromatography the unique role of acetic acid as a flavor constituent in pickled cheese and the non-essential nature of rancidity which was prevalent in some commercially available Feta or related soft, white, pickled cheeses but which was altogether absent in other variants of this cheese. Efthymiou and Mattick (1964) did not contemplate this fact and their method could not inherently produce a distinct flavor, determined by the development of acetic acid and no development of free fatty acids (see cheese of trial No 5, Table 2 herein).

In Feta-type soft cheese embodying a large amount of whey, considerable concentrations of lactose are entrapped. The continued fermentation of the residual lactose and the metabolic reduction of the lactic acid produced is essential and bears heavily upon the development of flavor. *S. faecium* as shown by experimentation, unlike all other lactic organisms of the prior art is capable of utilizing lactic acid anaerobically. *S. faecium* not only initiates a reduction of the concentration of lactic acid but also induces formation of acetic acid in the process. In addition, the advancement of protein degradation by *S. faecium* proteases contributes significantly to the proper ripening of pickled cheese. Applicant's process therefore produces a substantially predetermined high level of acetic acid against a low profile of free fatty acids and a cheese protein degradation by *S. faecium* to the point of removal of bitter flavor commonly associated with casein hydrolysis effected by many bacteria and enzyme preparations of the prior art.

It is respectfully submitted that this process is clearly novel and far beyond the state of the art or any suggestion thereof. Applicant has specified "the step of adding during the step of acidifying the milk the combination of ripening agents comprising a rated amount of proteolytic enzymes . . . and strains of *Streptococcus faecium* viable and active through the range of ripening parameters . . . " It is respectfully submitted that this microorganism is critical to the instant process and product and does yield an unexpected difference in taste and over-all physical characteristics in combination with a rated amount of proteolytic enzymes. It is a well known fact that the bacteria normally found in commercial lactic cheese starters do not survive for any great length of time in cheese. Efthymiou et al in their effort to effect controlled development of desirable body, texture and flavor characteristics typical of Feta cheese utilized such commercial lactic cheese starters. These authors made a developmental study in which various prior art ripening agents were introduced as variables into a basic method of manufacture resembling that of Sanders (1953). Their study was aimed at choosing ripening agents which would induce the best possible cheese. In evaluating their results they relied on a consumer panel which in each session were offered for evaluation a number of trial cheeses as experimental variables. It is noted that nowhere in their reported analytical evaluations did they compare experimental cheese with good quality imported Feta cheese in order to establish objectively the degree of improvement of their method. It is further noted, that according to their method (p. 594, under Cutting, curing and storage) "following salting, the cheese sections were inverted daily for seven days, then rinsed with cold water accompanied with a very gentle hand rubbing of the cheese surface . . . " Thus, the cheese according to their method remained exposed for a full 7 days to the air of the dairy plant. During this period therefore, this soft, moist cheese was subjected to heavy contamination from the environment. In view of these facts, the Efthymiou and Mattick process cannot be considered a controlled method of manufacture. The properties of the final product reflect as much indeed, the influence of inadvertent contamination as the influence of the enzyme preparations and bacteria employed. The separation of these foreign, uncontrolled influences were attained by applicant in subsequent experiments in which Feta cheese was made utilizing the enzymes and bacteria of Efthymiou et al., but under conditions excluding contamination from the environment. These subsequent, controlled experiments of C. J. Efthymiou showed that cheese made according to Efthymiou and Mattick had remarkably uniform characteristics which, however, consistently lacked the typical flavor of Feta cheese. These results explained, that environmental contamination produced the wide variation in flavor and chemical composition of the experimental cheeses of Efthymiou and Mattick (Table 1, p. 597). Especially noteworthy were their great differences in acetic acid content of similar cheese variables and of same age.

This difference amounted to about 300 percent in some cases reported in the cited publication. Naturally, the authors could not associate the levels of acetic acid in their cheeses with any specific metabolic function of the organisms they used. Obviously, the authors did not control the production of acetic acid which presumably was produced fortuitously through uncontrolled contamination. Their results indicate that their method is totally irrelevant to the claim of C. J. Efthymiou, i.e., of predictable, high levels of acetic acid being developed as the definite result of a definite step in the process of manufacture. Further proof of the inherent inability of the method of Efthymiou et al. to favorably affect acetic acid development in their cheese came from an independent professional evaluation of cheese made according to their method but with environmental contamination excluded. This objective, commercially valid report indicates clearly the consistent deficiency of the Efthymiou et al. cheese as far as typical Feta flavor is concerned. Moreover, this report noted the presence of high acidity and bitterness in certain samples made according to the method of Efthymiou et al. It is obvious from this report that cheese made according to Efthymiou et al is inherently different in kind and not simply degree from the prior art, imported cheese made from goat's or ewe's milk.

From the foregoing discussion of the prior art of Efthymiou et al it becomes evident that said art did not consistently and efficiently control production of acetic acid in pickled cheese. This latter development, however, has come as a definite significant improvement over the prior art by C. J. Efthymiou's introduction of *Streptococcus faecium* into the ripening process of pickled cheese. C. J. Efthymiou has in this respect provided an entirely new concept in introducing a resistant bacterial agent of long range activity in the ripening of pickled types of cheese such as Feta. Efthymiou et al. were neither aware nor concerned with, and, completely ignored the important and distinct flavor variants of Feta cheese. They did not intend to solve and could not solve the problem at that time. This problem has been overcome with the novel ripening agent and method.

Literature has been cited defining the determinative characteristics of *Streptococccus faecium* and substantiating its distinct and separate nature from *S. faecalis*. The following list of representative publications deal with the classification and taxonomic arrangement of these two micro-organisms.

Referring to List E, referrences 1 to 5 show that from a physiological, biochemical and structural point of view the two organisms are indeed distinct. Their differentiation based on numerous physiological, biochemical and other characteristics is documented in detail. These reports confirm that *S. faecalis* cannot be justifiably substituted for *S. faecium*, and vice-versa. Their inherent biochemical differences bear directly on the very divergent annd unrelated roles that these two species play in this novel cheese ripening process.

LIST E

REFERENCES CITED

1. Kandler, O., K. H. Schleifer, and R. Dandl. 1968. Differentiation of *Streptococcus faecalis* Andrews and Horder and *Streptococcus faecium* Oral-Jensen based on the amino acid composition of their murein. J. Bacteriol. 96:1935–1939.
2. Deibel, R. H. O. E. Lake, and C. F. Niven, Jr. 1963. Physiology of the enterococci as related to their taxonomy. J. Bacteriol. 86:1275–1282.
3. Whittenbury, R. 1965. The differentiation of *Streptococcus faecalis* and *S. faecium*. J. Gen. Microbiol. 38:279–287.
4. Barnes, E. M. 1956. Tetrazolium reduction as a means of differentiating *Streptococcus faecalis* from *Streptococcus faecium*. J. Gen. Microbiol. 14:57–68.
5. Raj, H., and R. R. Colwell. 1966. Taxonomy of enterococci by computer analysis. Can. J. Microbiol. 12:353–362.
6. Deibel, R. H. 1964. The group D. streptococci. Bacteriol. Rev. 28: 330–366.
7. Deibel, R. H., and C. F. Niven, Jr. 1964. Pyruvate fermentation by *Streptococcus faecalis*. J. Bacteriol. 88:4–10.
8. Fukuyama, T. T. and D. J. O'Kane. 1962. Galactose metabolism. I. Pathway of carbon in fermentation by *Streptococcus faecalis*. J. Bacteriol. 84:793–796.
9. London, J., and M. D. Appleman. 1962. Oxidative and glycerol metabolism of two species of enterococci. J. Bacteriol. 84: 597–598.
10. London, J. 1968. Regulation and function of lactate oxidation in *Streptococcus faecalis*. J. Bacteriol. 95:1380–1387.
11. Joseph, S. W., and C. J. Efthymiou 1971. Comparative Oxidative Enzyme Production by Enterococci and a Related Pediococcus. Bacteriological Procceedings 1971, page 148.

The above references show the distinct physiological and biochemical differences between *S. faecalis* snf *S. faecium* and confirm that the specific teachings of Kosikowski et al. concerning the biochemical role of *S. faecalis* in cheese flavor development do not relate and are not applicable to the subject, novel process of C. J. Efthymiou. Reference is made to List K.

LIST K

REFERENCES CITED

1. Dahlberg, A. C., and F. V. Kosikowski. 1948. The development of flavor in American cheddar cheese made from pasteurized milk with *S. faecalis* starter. J. of Dairy Sci. 31: 275–284.
2. Kosikowski, F. V. and A. C. Dahlberg. 1948. The growth and survival of *Streptococcus faecalis* in pasteurized milk American cheddar cheese. J. Dairy Sci. 31: 285–292.

3. Kosikowski, F. V. and A. C. Dahlberg, 1948. The tyramine content of cheese. J. Dairy Sci. 31: 293–303.

4. Dahlberg, A. C. and F. V. Kosikowski. 1949. The relationship of the amount of tyramine and the numbers of Streptococcus faecalis to the intensity of flavor in American cheddar cheese. J. of Dairy Sci. 31: 305–314.

5. Dahlberg, A. C. and F. V. Kosikowski. 1949. The bacterial count, tyramine content and quality score of commercial American cheddar and stirred curd cheese made with Streptococcus faecalis starter. J. Dairy Sci. 32: 630–636.

6. Kosikowski, F. V. 1951. The liberation of free amino acids in new and pasteurized milk cheddar during ripening. J. Dairy Sci. 34: 235–241.

Paper No. 1 shows that a common commercial lactic starter produced more volatile acidity in the cheese than the S. faecalis starter. This observation was consistent in experimental cheese 1 to 180 days old. A similar pattern in comparison with the control cheese was shown by the effected proteolysis. S. faecalis produced less proteolysis than the commercial lactic starter. However, the authors were able to establish flavor superiority of the cheese made with S. faecalis.

In Paper No. 2 the authors established that the same organism was able to grow and survive in large numbers in cheese even after 180 days of ripening at 50° and at 60° F.

In Paper No. 3 the authors established in certain cheeses variable amounts of tyramine, a metabolic product of tyrosine accumulating by a process of decarboxylation which is associated with S. faecalis.

In Paper No. 4 the authors established that a cheese made with the addition of S. faecalis developed the highest tyramine content and the most pronounced cheddar flavor. It also established that the intensity of the flavor of cheddar cheese increased as the tyramine content increased. Flavor with low tyramine content was always flat irrespective of age of the cheese.

In Paper No. 5 the authors found further evidence supporting the findings of paper No. 4.

In Paper No. 6 the authors found no differences in the free amino acid patterns between cheese made with and without the addition of S. faecalis. Again, their results concerning quality of cheese flavor, affected by tyramine content, indicated an advantageous role by S. faecalis.

It becomes clear, therefore, that S. faecalis, according to the teaching of Kosikowski et al, although useful in the ripening of cheddar cheese does not and is not intended to accomplish the primary aims set forth in the disclosure of the subject process and product.

C. J. Efthymiou's process and product utilizes S. faecium for the development of volatile acidity (acetic acid) which is the primary constituent of the flavor profile of pickled type cheese (Efthymiou, 1967). The organism taught by Kosikowski (1966) not only is unsuited for this purpose but also it was shown by Kosikowski et al. to induce less volatile acidity than the common lactic organisms used in cheese starters.

It is then clear that Kosikowski does not provide for effective control of acetic acid development in cheese. Furthermore, it is known that formic acid, a noxious substance as far as pickled cheese flavor is concerned, will be among the metabolic products of S. faecalis (see references No. 7 and No. 8 of List E). On the other hand, C. J. Efthymiou's micro-organism fits exclusively in this respect, the ecological conditions of pickled cheese ripening. Considerable amounts of lactose remaining in the whey which is entrapped in the cheese during manufacture are converted to lactic acid and acetic acid by S. faecium. This "clean" production of acetic acid, that is, without concomitant accumulation of formic acid is the inherent biochemical property of Streptococcus faecium, not of S. faecalis. Also, the expected Kosikowski flavor effect in cheese made with S. faecalis relates to tyramine production, which, according to Deibel (see Paper No. 2, List E, p. 1277) is one of the equivocal metabolic properties of the species S. faecium, many strains of which do not possess tyrosine decarboxylase. Furthermore, in pickled cheese, where the ripening period prior to marketing is very short, tyramine cannot be anticipated to function as a distinctive flavor constituent even if S. faecalis is introduced for its consistent development. The two species S. faecalis and S. faecium are further compared as to type of metabolic activity that they can carry out in the ripening of pickled cheese. Both species are inherently capable of metabolizing lactic acid which is the terminal product of lactose utilization of all prior art lactic acid bacteria. In vigorously aerated cultures, S. faecalis dissimilates lactate to produce acetic acid, acetylmethyl carbinol and $CO_2$. S. faecium also produces acetic acid and $CO_2$, but only a small percentage of lactate is converted to acetylmethylcarbinol. According to London and Appleman (Paper No. 9, List E) the acetateacetylmethylcarbinol ratio is 1:1 for S. faecalis, while it is 35:1 for S. faecium. It is obvious that under the stated aerobic conditions S. faecium is quantitatively far more efficient as acetic acid producer than S. faecalis. Furthermore, under the real conditions prevailing in the ripening cheese where the oxygen tension is very low and therefore anaerobic rather than aerobic conditions prevail, the difference in activity between S. faecium and S. faecalis is even more greater. Thus, according to London (Paper No. 10, List E) anaerobic conditions repress lactate oxidation in S. faecalis (note: London thought that he worked with S. faecium when he carried out the cited study. Later on, however, he discovered the error and made the correction: Journal of Bacteriology Issue No. 1, July, 1969). Comparative fluorograms indicating significant differences in the oxidative activity of S. faecalis and S. faecium respectively, cultured under aerobic and anaerobic conditions were presented by the applicant May 4, 1971, at the 71st Annual Meeting of the American Society for Microbiology in Minneapolis, Minn. (Paper No. 11, List E). Under aerobic conditions both organisms showed NAD-linked lactate oxidoreductase activity, the one shown by S. faecium being stronger (1.0mV vs 0.3mV of S. faecalis). Anaerobically, S. faecium showed an activity of 0.5mV units whereas S. faecalis showed no lactic acid oxidoreductase activity at all.

C. J. Efthymiou uses proteolytic agents which include either proteolytic microbial strains or proteolytic enzyme preparations which, if used induce the development of bitter flavor in the cheese. When added in combination, however, with strains of S. faecium which are viable through the range of ripening parameters, proteolysis is advanced to the point where the cheese is substantially free of bitter flavor. Thus, a common defect especially evident in pickled cheese made from cow's milk using prior art methods is eliminated.

When the production of a rancid type of Feta is desired, a known Feta process using pregastric esterases of kid and lamb is improved by applicant with the addition of rated amounts of selected strains of proteolytic lactobacilli responsive to control by said esterases and *Streptococcus faecium* viable and active through the range of ripening parameters to produce a substantially predetermined relatively high level of acetic acid against a low profile of free fatty acids without bitterness. The result of this improvement step is an integrated system of ripening agents which controls total ripening, that is, the sum total of bio-chemical changes that the bio-degradable and body, texture and flavor contributing substrates present in pickled cheese undergo during ripening.

These substrates include cheese protein and related products obtained by hydrolysis, lactose and intermediate metabolites including lactic acid and finally lipids. This novel interaction is accomplished in a complex yet smooth way. It utilizes to advantage even antagonistic relationships such as those existing between fatty acids and the selected strains of lactic proteolytic bacteria. This novel, improved process utilizes this latter antagonistic relationship to effectively control protein hydrolysis and soluble body development.

This process produces a novel, soft, white, pickled cheese having the inherent chemical composition of cow's milk cheese, but substantially having the unique organoleptic characteristics of a quality, pickled cheese made from ewe'milk. Moreover, when *Streptococcus faecium* is used in this process as disclosed by applicant, C. J. Efthymiou, it is not only active through the initial stages of pickled cheese ripening as are other known starter cultures, but it remains viable and active as a ripening agent in the resultant cheese product from which it can be isolated and identified over an indefinite period of time.

Although the prior art discloses the use of pregastric esterases and other lipolytic agents, the introduction of such enzymes according to the present process, beyond the induction of a moderate level of rancidity, has as an object the controlled rapid development of substantial levels of soluble nitrogen and the avoidance of an excessively hydrolyzed cheese. The unregulated introduction of bacterial proteolytic agents may lead to an unrestrained breakdown of the cheese protein and a pasty finished product which is not readily marketable. As described earlier, the controlling effect of said enzymes is exercised through the inhibitory action of the freed fatty acids on the susceptible proteolytic baccteria selectively used. The free fatty acid pattern obtained in Feta cheese made with the addition of kid and lamb pregastric esterases in mixture, is preferred over other patterns obtained through the use of lipases from other sources. This flavor inducing function is secondary to the control the lipases exercise on the proteolytic agents, which are added in a relatively high proportion to the ordinary lactic starter in order to achieve rapid results of body and texture development according to one method of the invention.

The above steps or improvements introduced in the process of manufacture of Feta cheese according to the subject invention as a result of non routine experimentation, are novel, since they are not inherent in nor can they be deduced from the application of the teachings of earlier researchers.

Although the invention has been described and a certain specific example has been given, it is apparent that other combinations of ripening agents may be employed and also other suitable means may be used to effect coagulation, cheese cutting, natural or artificial curing and storage without departing from the spirit and scope of the invention.

Having thus described my invention, I claim,

1. In a process for making soft, white, pickled, Feta-type cheese, the step of pasteurizing the milk, the step of acidifying the milk to a sufficient increase of titratable acidity to effect optimal coagulation using conventional means such as lactic acid producing bacteria or food acid, the step of inducing coagulation, the step of allowing coagulation to produce a curd, the step of cutting the curd into suitable pieces to remove whey, the step of mechanically agitating the cut curd to facilitate further whey expulsion and development of firmness, the step of dipping the curd into perforated containers to further expel whey, give shape to the cheese and effect initial ripening, the step of agitating the containers to enhance uniform drainage at room temperature, the step of transferring the containers to a curing room maintained at a temperature below approximately 68° F. with a high relative humidity, the step of cutting the cheese into suitable pieces which are salted up to approximately 3 percent of the weight of the ripened cheese, the step of exposing the cheese uniformly to ripening conditions by suitable manipulation, and the improvement which comprises the step of adding during the step of acidifying the milk the combination of ripening agents comprising a rated amount of proteolytic lacto-bacilli to effect a controlled, advanced degree of proteolysis associated with a creamy, soluble body and *Streptococcus faecium* strains of enterococci viable and active through the range of ripening parameters, said process producing a substantially predetermined high level of acetic acid against a low profile of free fatty acids and a piquant, pickled cheese, the flavor of which is practiccally devoid of rancidity and bitterness.

2. In a process for making soft, white, pickled Feta-type cheese, the step of pasteurizing the milk, the step of acidifying the milk to a sufficient increase of titratable acidity to effect optimal coagulation using conventional means such as lactic acid producing bacteria or food acid, the step of adding pregastric esterases of kid and lamb origin to effect a specific type of rancid flavor, the step of inducing coagulation, the step of allowing coagulaltion to produce a curd, the step of cutting the curd into suitable pieces to remove whey, the step of mechanically agitating the cut curd to facilitate further whey expulsion and development of firmness, the step of dipping the curd into perforated containers to further expel whey, give shape to the cheese and effect initial ripening, the step of agitating the containers to enhance uniform drainage at room temperature, the step of transferring the containers to a curing room maintained at a predetermined temperature less than approximately 68° F. and a high relative humidity, the step of cutting the cheese into suitable pieces which are salted up to approximately 3 percent of the weight of the ripened cheese, the step of exposing the cheese uniformly to ripening conditions by suitable manipulations, and the improvement which comprises the step of adding during the step of acidifying the milk the combination of rated amounts of selected strains of proteolytic lacto-bacilli which are responsive to a control by said esterases to effect a rapid limited degree of proteolysis and strains of *Streptococcus faecium* viable and active through the range of ripening parameters to produce a substantially predetermined relatively high level of acetic acid against a moderate, low profile of free fatty acids and to advance the degree of proteolysis to the point where the cheese possesses the characteristic acetic rancid flavor but which is substantially free of bitter flavor.

3. A soft, white, pickled, Feta-type cheese product produced from cow's milk by the process of claim 1.

* * * * *